(12) United States Patent
Latham et al.

(10) Patent No.: US 11,106,916 B2
(45) Date of Patent: Aug. 31, 2021

(54) IDENTIFYING SEGMENT STARTING LOCATIONS IN VIDEO COMPILATIONS

(71) Applicant: International Business Machines Corporation, Armonk, NY (US)

(72) Inventors: Thomas J. Latham, Eastleigh (GB); Jack E. Dunning, Lyndhurst (GB); Jordan R. Cain, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/548,920

(22) Filed: Aug. 23, 2019

(65) Prior Publication Data

US 2021/0056311 A1 Feb. 25, 2021

(51) Int. Cl.
| | | |
|---|---|---|
| *G11B 27/00* | (2006.01) | |
| *H04N 9/80* | (2006.01) | |
| *G06K 9/00* | (2006.01) | |
| *G06K 9/34* | (2006.01) | |
| *H04N 21/8405* | (2011.01) | |
| *H04N 21/845* | (2011.01) | |
| *H04N 21/84* | (2011.01) | |

(52) U.S. Cl.
CPC ..... *G06K 9/00718* (2013.01); *G06K 9/00744* (2013.01); *G06K 9/344* (2013.01); *H04N 21/8405* (2013.01); *H04N 21/8456* (2013.01); *G06K 2009/00738* (2013.01); *G06K 2209/01* (2013.01)

(58) Field of Classification Search
USPC ............... 386/241, 239, 244, 245, 248, 278
See application file for complete search history.

(56) References Cited

U.S. PATENT DOCUMENTS

| | | | |
|---|---|---|---|
| 7,319,806 B1 | 1/2008 | Willner | |
| 8,826,117 B1 | 9/2014 | Junee | |
| 2011/0075992 A1* | 3/2011 | Mei | H04N 21/458 386/249 |
| 2012/0087637 A1 | 4/2012 | Logan | |
| 2013/0011121 A1* | 1/2013 | Forsyth | G11B 27/034 386/245 |
| 2015/0010288 A1* | 1/2015 | Aggarwal | H04N 21/4884 386/240 |

(Continued)

OTHER PUBLICATIONS

Khatri et al., "Video OCR for Indexing and Retrieval", International Journal of Computer Applications (0975-8887), vol. 118—No. 2, May 2015, 4 pages.

(Continued)

*Primary Examiner* — Daquan Zhao
(74) *Attorney, Agent, or Firm* — David B. Woycechowsky

(57) ABSTRACT

Technology for identifying segment starting locations in video compilations. The method includes: receiving an enumerated video compilation of a plurality of joined video segments; identifying enumerating text in key frames of the video compilation, wherein the key frames are at time intervals in the video compilation; and storing identified enumerating text information in relation to the key frames. The method then includes: analyzing the stored enumerating text information to identify time locations in the video compilation of a first occurrence of each enumerating value; and providing location references in the video compilation of the identified time locations for navigation.

20 Claims, 7 Drawing Sheets

(56) References Cited

U.S. PATENT DOCUMENTS

2018/0013806 A1  1/2018  Venkatraman

OTHER PUBLICATIONS

S., Sankirti et al., "Video OCR for Video Indexing", IACSIT International Journal of Engineering and Technology, vol. 3, No. 3, Jun. 2011, 3 pages.
Solanki, Adarsh, Announcing Video OCR Private Preview on Azure Media Analytics, Program Manager, Azure Media Services, Posted on Apr. 20, 2016, 13 pages, <https://azure.microsoft.com/en-us/blog/ocr-on-azure-media-analytics/>.

* cited by examiner

IDENTIFYING SEGMENT STARTING LOCATIONS IN VIDEO COMPILATIONS

BACKGROUND

The present invention relates to identifying segment starting locations in video compilations, and more specifically, to identifying segment starting locations for navigation through an enumerating video compilation.

Videos have become very popular that show a ranking of video clips that are enumerated in a category, such as a "Top 10", "Top 100", etc. These videos combine a number of different video clips from the same or different sources into a compilation of relevant content. For example, these include "Top 50 funniest clips of the week" videos and "Top 10 fails of the week" videos. This video compilations are referred to herein as "enumerated compilations".

As the number of these video compilations increases, as does the likelihood that a user has seen a clip included in the compilation before. Users typically like to skip these previously seen clips and move onto the next one.

Currently, to do this, the user has to slowly scroll through the video until they recognize a difference in the video where the next clip has started.

SUMMARY

According to an aspect of the present invention, there is a method, computer program product and/or system that performs the following operations (not necessarily in the following order): (i) receiving an enumerated video compilation, with the enumerated video compilation including a plurality of joined video segments, and with the plurality of joined video segments including a plurality of key frames occurring at time intervals within the joined video segments; (ii) identifying a plurality of portions of enumerating text in the plurality of key frames; (iii) storing the plurality of portions of enumerating text and an identification of respectively corresponding key frames where each portion of enumerating text is respectively located; (iv) analyzing the plurality of portions of enumerating text to identify time locations in the video compilation of a first occurrence of each portion of enumerating text; (v) providing location references in the video compilation that respectively link to the identified time locations; and (vi) navigating, with respect to time, through the plurality of joined video segments based, at least in part, on the location references.

According to an aspect of the present invention, there is a method, computer program product and/or system that performs the following operations (not necessarily in the following order): (i) receiving an enumerated video compilation, with the enumerated video compilation including a plurality of joined video segments, and with the plurality of joined video segments including a plurality of key frames occurring at time intervals within the joined video segments, (ii) identifying a plurality of portions of enumerating text in the plurality of key frames, (iii) storing the plurality of portions of enumerating text and an identification of respectively corresponding key frames where each portion of enumerating text is respectively located, (iv) analyzing the plurality of portions of enumerating text to identify time locations in the video compilation of a first occurrence of each portion of enumerating text, (v) providing location references in the video compilation that respectively link to the identified time locations, and (iv) navigating, with respect to time, through the plurality of joined video segments based, at least in part, on the location references.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Some embodiments of the present invention may recognize, one, or more, of the following challenges, problems, opportunities for improvement and or fax with respect to the current state of the art: (i) the currently conventional process, described above in the Background section, involves trial and error; (ii) the currently conventional process, described above in the Background section, may result in missing the next clip's content and may be frustrating and time-consuming to the user; (iii) currently conventional solutions to this problem provide the user with an incremental time jump function that may forward by set intervals (for example, 5 second intervals, or a slider function that the user can use to perform a granular fast forward); and/or (iv) both of these methods require the user to spot the video clip change.

The described method and system are provided for identifying segment starting locations in enumerated video compilations. Enumerated video compilations are made up of a plurality of joined video segments or clips that count up or down a ranking of the video segments.

The method uses analysis of key frames of the enumerated video compilation to identify the locations in the video of the start of each segment that counts up or down the ranking. Location references may then be provided in a user interface or in the video time bar to aid navigation between segments, in particular to skip a segment and move to the next one.

Figure 1:
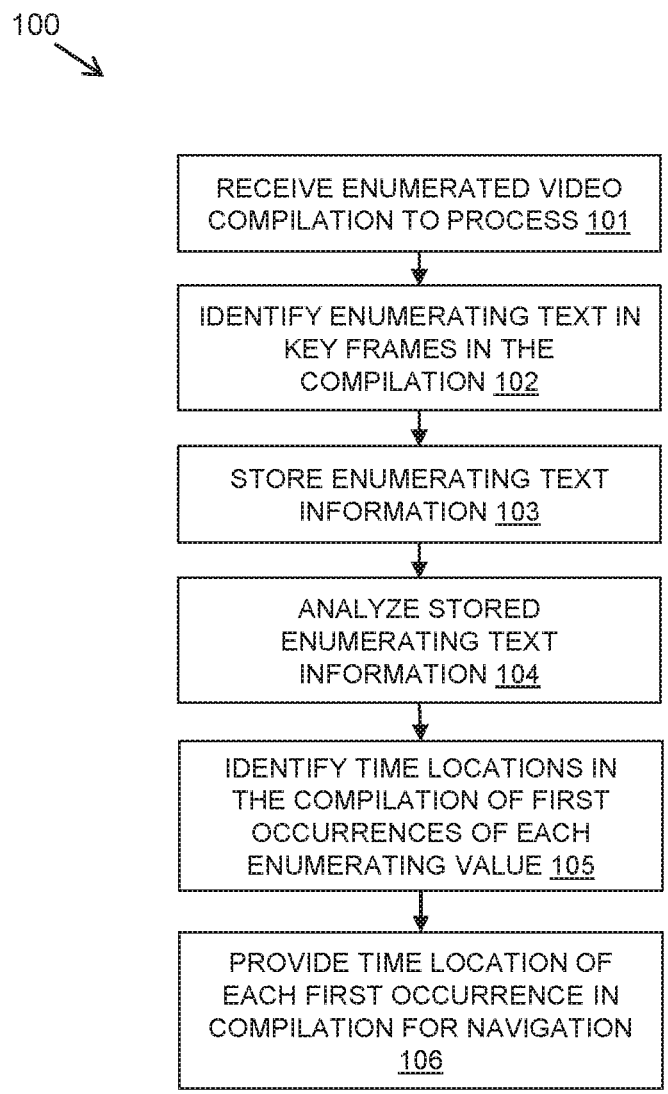
FIG. 1 is a flow diagram of an example embodiment of a method in accordance with the present invention.

Referring to FIG. 1, a flow diagram 100 shows an example embodiment of the described method. The method may receive 101 an enumerated video compilation to process. The enumerated video compilation may be formed by a plurality of video segments that are joined together in the compilation. The video segments may have enumerating text indicating the countdown of the segments in the compilation. Enumerated compilation videos usually either display a number in a consistent position on the video display at the start of each segment or cut between video segments with a transition where a number is show in the video.

The method may identify 102 the enumerating text in key frames of the compilation. Key frames may be at time intervals in the video compilation with a frequency of key frames configured for efficient processing of the video compilation. The described method uses Optical Character Recognition (OCR) to look for common incremental number patterns often found in enumerated compilation videos. The enumerating text may be numerals, including Arabic numerals, Roman numerals, different language numerals, or may be text words of the numbers.

The method may store 103 enumerating text information identified in the compilation in relation to or with reference to the key frames in which it is identified and may analyze 104 the stored text information.

Using the analysis, the method may identify 105 time locations in the compilation video of the first occurrence of each enumerating value.

Using the described method, the time location when the enumerated values first appear on screen in the video compilation is provided 106 as a reference point for the beginning of a new segment in the compilation. The list of reference points can then be made available to the user as quick skip options via a number of different user interface display options such as a next button, previous button, or a list of clickable icons.

The described method has advantages over existing video playback adjustment systems by being able to move through a video precisely, to a previously unknown location, rather than the current trial and error of using the time-bar and image preview to determine when a clip begins and ends.

The method automatically generates metadata relating to the enumerating sequence of segments by scanning for enumerating text in the video.

Figure 2:
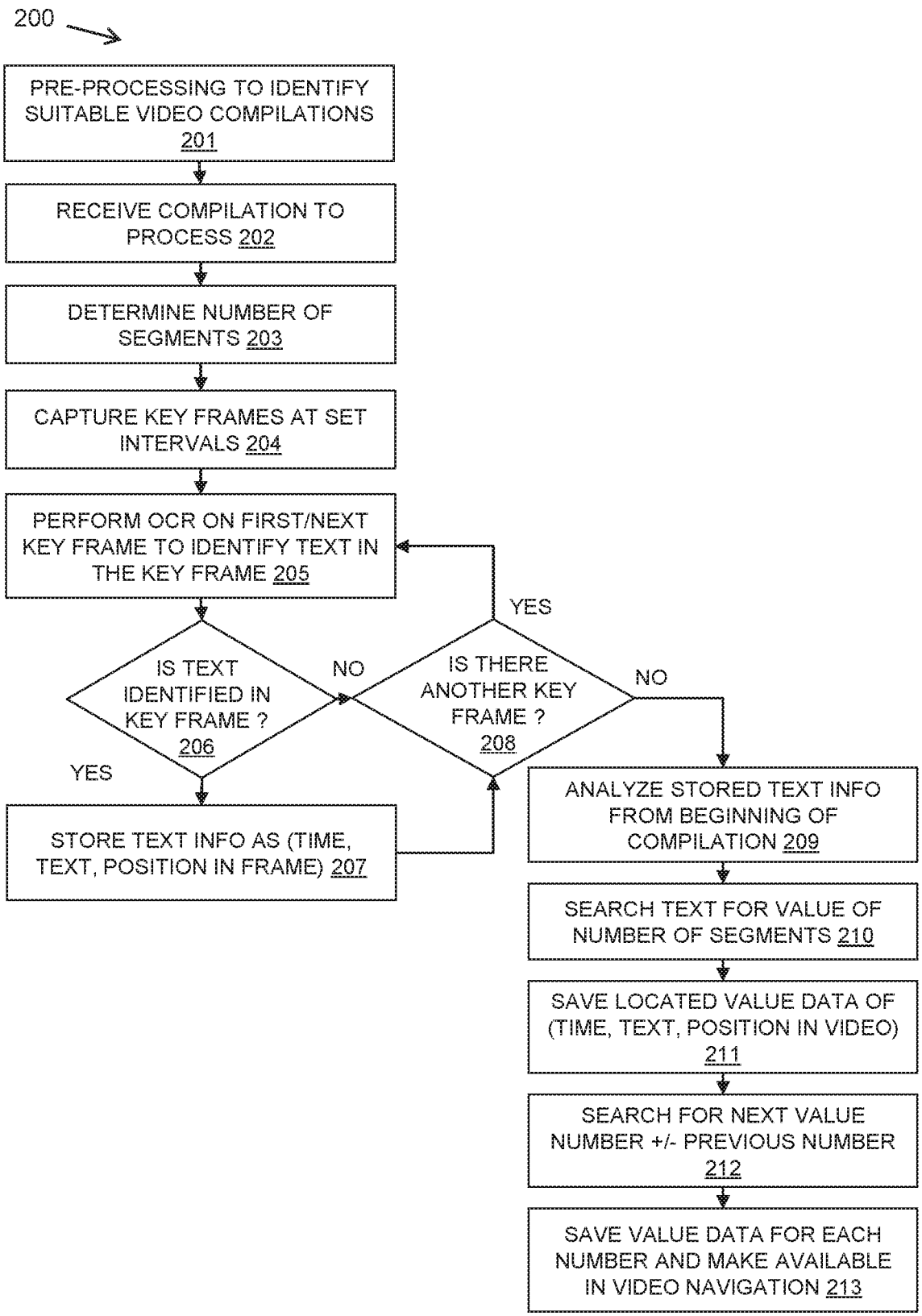
FIG. 2 is a flow diagram of a further example embodiment of a method in accordance with the present invention.

Referring to FIG. 2, a further more detailed example embodiment of the described method is shown in flow diagram 200.

Not all videos are appropriate for the proposed method and so a pre-processing 201 may be applied for finding video compilations for which the described method is applicable. This may involve scanning a video's title and/or description to find key words and phrases such as "top 10/50/n of sport/game/TV show" or "10/50/n best/worst/weirdest/scariest moments".

The method may receive 202 a video compilation to process and the expected number of video segments in the compilation may be determined 203 and stored. For example, a video titled "Top 10 football goals", the value of 10 or 1 would be stored as the expected initial value. The initial value is referred to as the "search_number".

The method may capture 204 key frames at set time intervals in the video compilation. For example, every 0.5/1/2/n seconds the current frame of the video may be captured as key frames. As the frequency of captured key frames is increased, the accuracy of time locations is increased; however, there is a corresponding increase in the processor and time cost. Therefore, the key frame interval may be configured appropriately.

The method may perform 205 an OCR scan of a first or next key frame to identify enumerating text the key frame. It may be determined 206 if there is enumerating text in a key frame.

If enumerating text is found in the key frame, the method stores 207 the information relating to the text including: timestamp, text string found, position of text (x,y) in the key frame. All of the information stored is standard for most modern OCR tools and is often presented as JavaScript Object Notation (JSON) data (JavaScript is a trademark of Oracle America, Inc.). The method then proceeds to determine 208 if there is another key frame.

If there is no text in the key frame, the method may also proceed to determine 208 if there is another key frame. If there is another key frame, the method loops to perform 205 OCR on the next key frame to identify enumerating text in the key frame.

Once all the key frames have been processed and it is determined 208 that there are no further key frames, analysis 209 is performed on all of the stored text information data from the OCR scan starting at the beginning of the video compilation.

The method may use various methods for locating the starting point of enumerating text values in the stored text information. In some compilation videos the enumerated count is a count down and the maximum "search_number" value may be located first followed by decrementing values being located in the video. Alternatively, a minimum enumerating value, such as "1", may be located in the video compilation, followed by locating incrementing values until all the values of the enumeration are found.

In the method described with reference to FIG. 2, the method searches 210 the stored text information for the first entry in the count, namely the value of search_number. Upon finding search_number value, the value data relating to its location is saved 211 including: timestamp, text string, position in key frame. This data may help with locating the next number in the following key frames.

The next value, which will be search_number+/−1 (depending on whether the enumerating is counting up or down), may be searched 212 for.

The next value may be searched 212 in the same area of the video as the previous value. When the search number if consistently found in the same location, for example the bottom-left corner, the system will prioritize found search numbers from this location.

This may be carried out by drawing boundary boxes around positions on the display screen where text is found to provide a level of tolerance for positions. When new text is found in a boundary box, a correlation in the difference in text is looked for. If the expected next number is found in a different area, the data values are stored and the method continues to look for search number+/−1 and search number+/−2. If search number+/−2 is found, the data values for this is also stored. When an expected value is found at the correct position, the data relating to it is saved 213 (timestamp, text, position).

For example, if 10, 9, 8 are found in a bottom-left corner and this location is stored, then finding a 7 in top-right of the frame may be temporarily held and if the system later finds a 7 in the bottom-left corner, it then knows to discard the previously found 7, at which point it then starts looking for 6 and so forth.

The method may also identify a missing enumerating value and may search a portion of the video compilation between neighboring found enumerating values at a higher frequency of key frames.

For example, if for the given sequence, entries 5, 4, 2, and 1 are found, but entry 3 is not found, then key frames may be analyzed, at a higher frequency (such as the original frequency*2), on the video between the timestamps for entry 4 and 2.

The method may make a best effort to find the missing value, for example, 3, but if, after increasing the frequency by a custom threshold limit, it is not found the method may decide not to search any further.

The method may use the saved data for each of the enumeration values found and may make their locations available by a control in the displaying user interface and/or by marking them on the video's time bar.

Figure 3:
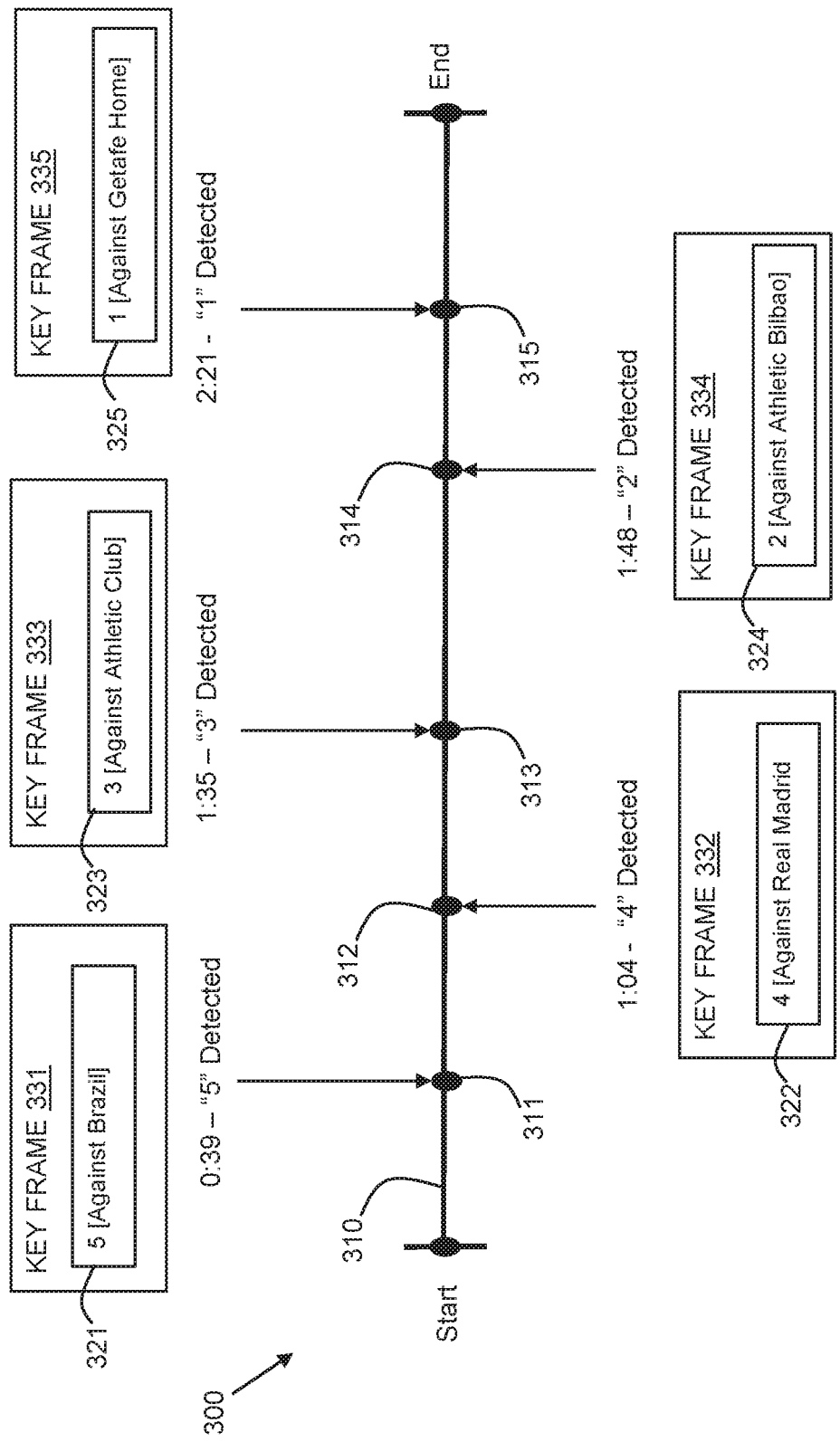
FIG. 3 is a schematic diagram of an example application of the described method and system.

Referring to FIG. 3, a worked example 300 is illustrated.

For the example video "Top 5 football shots", the method first identifies during pre-processing that this video is applicable as it has "Top 5" in the name. The "5" is then extracted and stored as the initial expected value to find in the video.

The system then performs OCR on key frames from every 1 second in the video.

Using the stored text which was found during OCR, the system first searches for the expected "5" to be found and stores the timestamp of this entry. The system then repeats this step (decrementing 5 until 1 is reached). Upon completion, 5 entries should be stored and they can then be linked to user interface controls to allow the user to move the video playback to the exact locations.

In FIG. 3, a timeline 310 of the video compilation is shown on which identified time locations 311-315 are found for key frames 331-335 with first instances of the enumerated values 321-325 found in the key frames 331-335.

At time 0.39 seconds from the start of the video, a key frame 331 is located with text "5 [Against Brazil]". This marks the location of the first segment of the video.

At time 1.04 seconds from the start of the video, a key frame 332 is located with text "4 [Against Real Madrid]". This marks the location of the second segment of the video.

At time 1.35 seconds from the start of the video, a key frame 333 is located with text "3 [Against Athletic Club]". This marks the location of the third segment of the video.

At time 1.48 seconds from the start of the video, a key frame 334 is located with text "2 [Against Athletic Bilbao]". This marks the location of the fourth segment of the video.

At time 2.21 seconds from the start of the video, a key frame 335 is located with text "1 [Against Getafe Home]". This marks the location of the fifth and last segment of the video.

The points 311-315 along the timeline 310 of the starts of each segment may then be used to navigate or skip to the start of each segment.

The described method of scanning text using OCR in combination with the context of a video's content, allows for an improved indexing of the video for use in skip controls. This improves indexing of the video compilation and navigating through the frames of the video compilation using one or more user interface display options.

Figure 4:
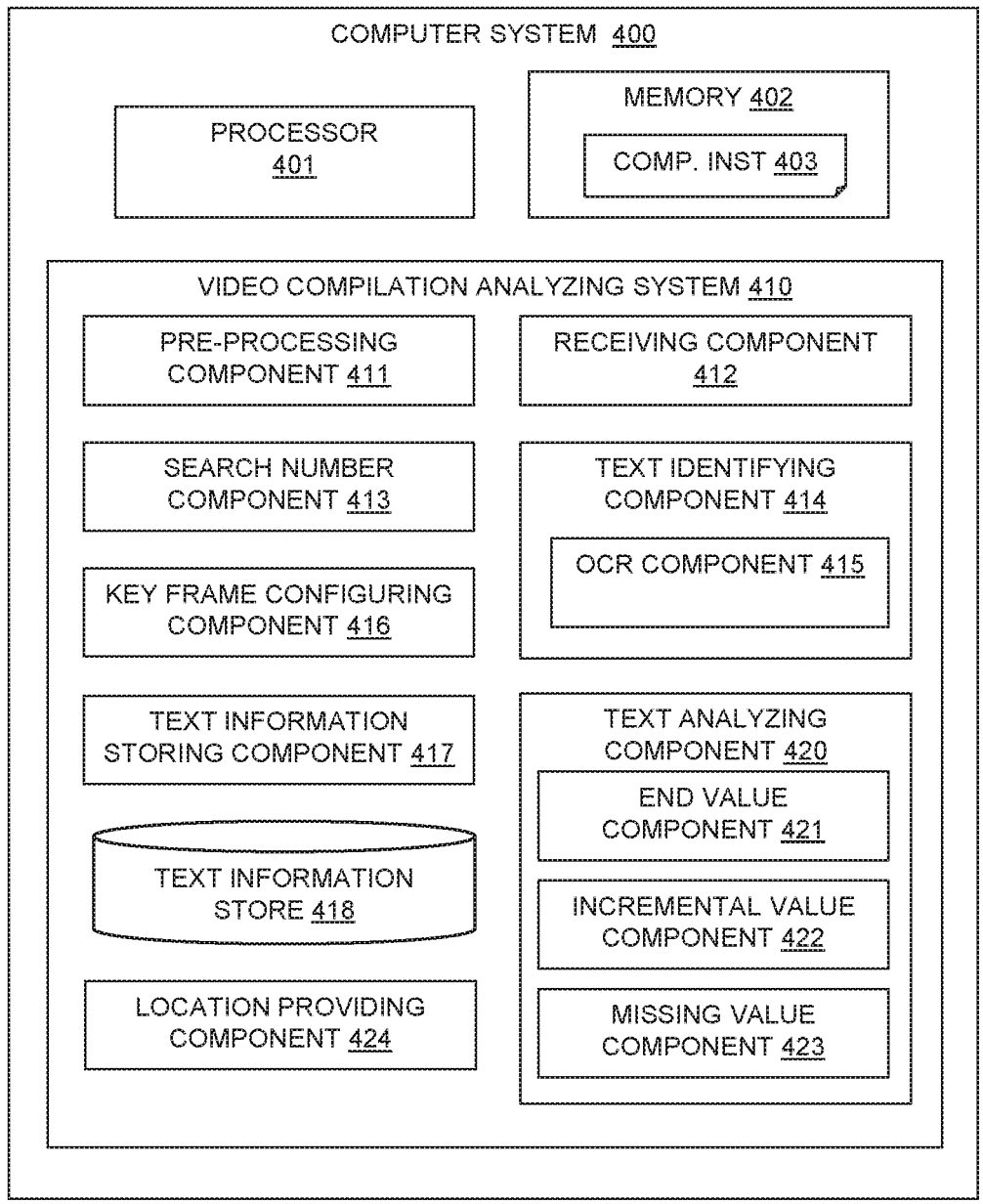
FIG. 4 is block diagram of an example embodiment of a system in accordance with the present invention.

Referring to FIG. 4, a block diagram shows a system diagram of a computer system 400 in which a video compilation analyzing system 410 may be provided.

The computer system 400 includes at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The video compilation analyzing system 410 may include a pre-processing component 411 for pre-processing a video compilation by analyzing a title or description of the video compilation to determine if it enumerates joined video segments to determine that it is an enumerated video compilation. If the pre-processing component 411 identifies a video as suitable, a receiving component 412 may be provided for receiving the enumerated video compilation of a plurality of joined video segments for analysis.

The video compilation analyzing system 410 may include a search number component 413 for analyzing a title or a description of a received enumerated video compilation to obtain a search number value for the enumerated video compilation of the number of enumerated segments.

The video compilation analyzing system 410 may include a key frame configuring component 416 for configuring time intervals and dividing the video compilation into suitable key frames.

The video compilation analyzing system 410 may include a text identifying component 414 for identifying enumerating text in key frames of the video compilation including an OCR component 415 for performing an OCR scan on the key frames.

The video compilation analyzing system 410 may include a text information storing component 417 for storing identified enumerating text information in relation to the key frames including storing a time, text string, and location in the key frame. The text information may be stored in a suitable data store 418 for further analysis.

The video compilation analyzing system 410 may include a text analyzing component 420 for analyzing the stored enumerating text information to identify time locations in the video compilation of a first occurrence of each enumerating value.

The text analyzing component 420 may include: an end value component 421 for locating a maximum or minimum enumerating value and determining a frame location in a key frame, an incremental value component 422 for locating incrementing or decrementing enumerating values in corresponding frame locations in key frames, and a missing value component 423 for identifying any missing enumerating value and searching a portion of the video compilation between neighboring found enumerating values at a higher frequency of key frames.

The video compilation analyzing system 410 may include a location providing component 424 for providing location references in the video compilation of the identified time locations for navigation, such as providing a user interface control to move to the location references on demand, or marking the location references on the video compilation's time bar.

Figure 5:
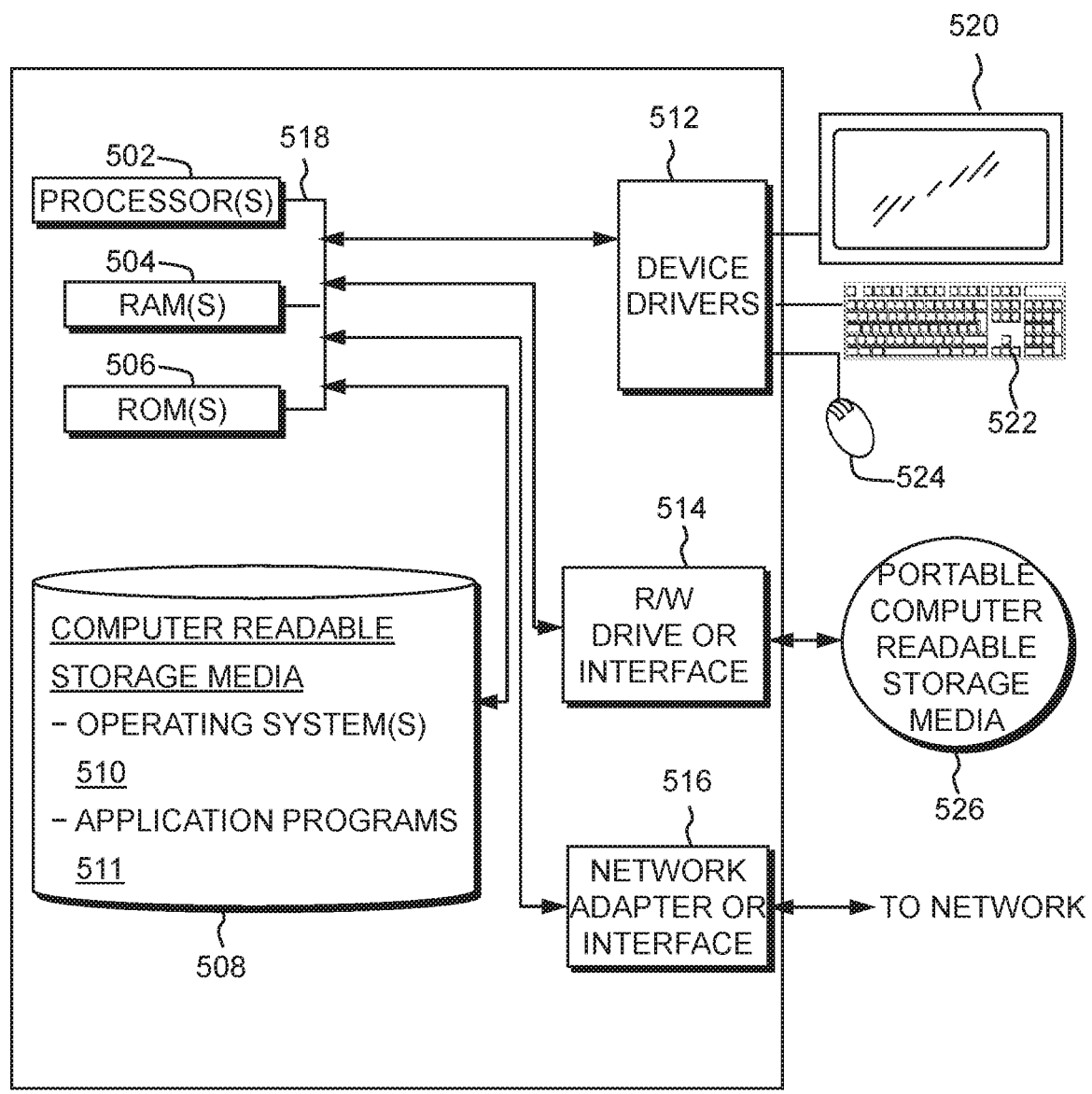
FIG. 5 is a block diagram of an embodiment of a computer system or cloud server in which the present invention may be implemented.

FIG. 5 depicts a block diagram of components of the computer system 400 of FIG. 4, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing system 400 can include one or more processors 502, one or more computer-readable RAMs 504, one or more computer-readable ROMs 506, one or more computer readable storage media 508, device drivers 512, read/write drive or interface 514, and network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within the system.

One or more operating systems 510, and application programs 511, such as the video compilation analyzing system 410 are stored on one or more of the computer readable storage media 508 for execution by one or more of the processors 502 via one or more of the respective RAMs 504 (which typically include cache memory). In the illustrated embodiment, each of the computer readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system 400 can also include a R/W drive or interface 514 to read from and write to one or more portable computer readable storage media 526. Application programs 511 on computing system 400 can be stored on one or more of the portable computer readable storage media 526, read via the respective R/W drive or interface 514 and loaded into the respective computer readable storage media 508.

Computing system 400 can also include a network adapter or interface 516, such as a TCP/IP adapter card or wireless communication adapter. Application programs 511 on computing system 400 can be downloaded to the computing device from an external computer or external storage device via a network (for example, the Internet, a local area network or other wide area networks or wireless networks) and network adapter or interface 516. From the network adapter or interface 516, the programs may be loaded into the computer readable storage media 508. The network may comprise copper wires, optical fibers, wireless transmission, routers, firewalls, switches, gateway computers and edge servers.

Computing system 400 can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514, and network adapter or interface 516 can comprise hardware and software stored in computer readable storage media 508 and/or ROM 506.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
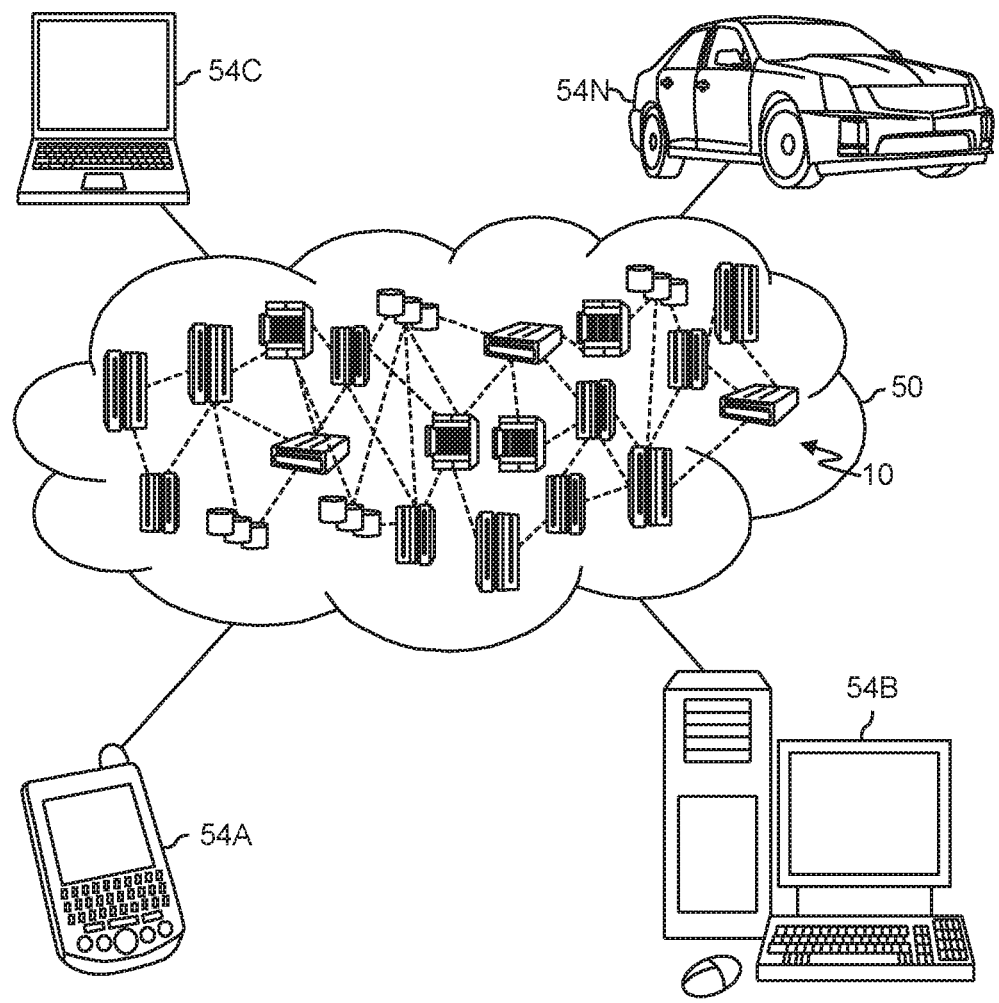
FIG. 6 is a schematic diagram of a cloud computing environment in which the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (for example, using a web browser).

Figure 7:
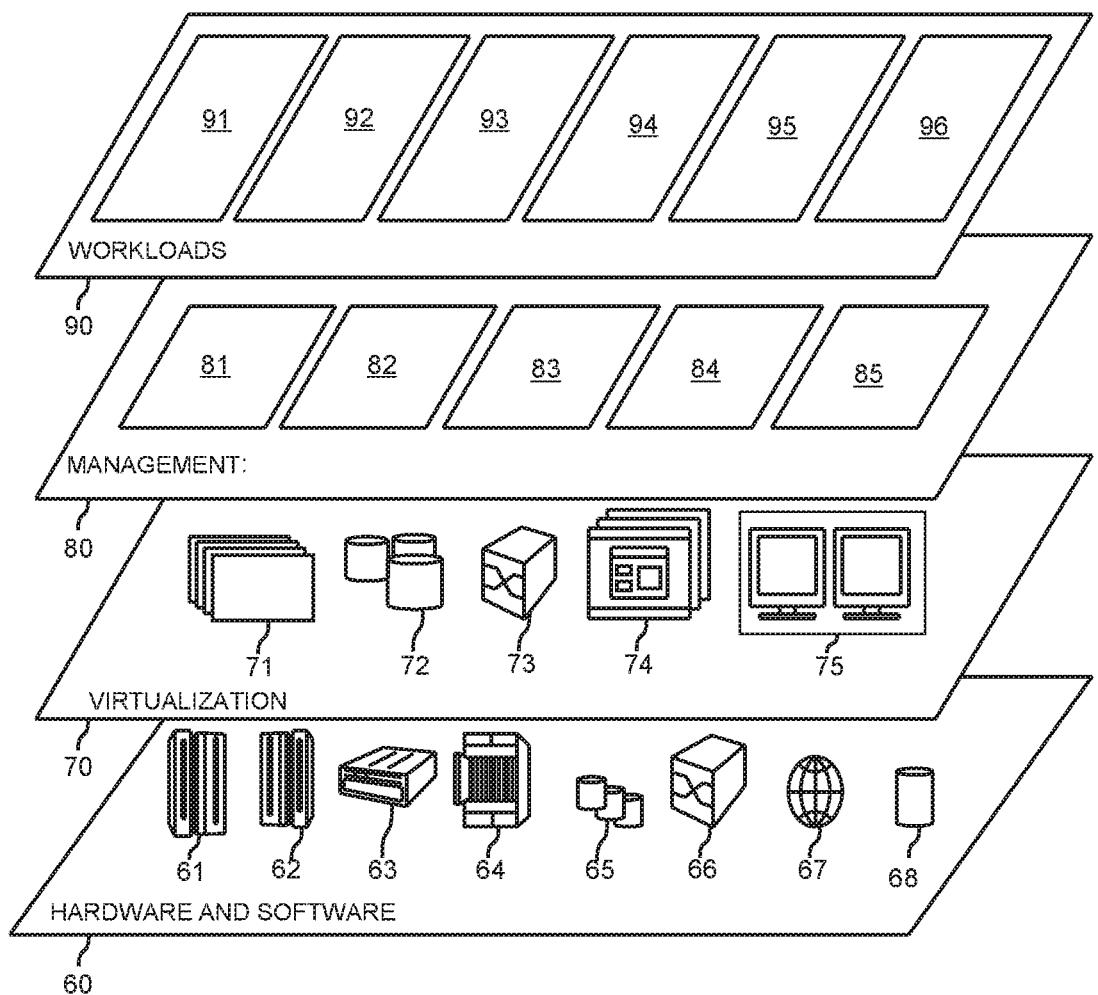
FIG. 7 is a diagram of abstraction model layers of a cloud computing environment in which the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method (CIM) for identifying segment starting locations in video compilations, the CIM comprising:

receiving an enumerated video compilation, with the enumerated video compilation including a plurality of enumerated video segments within a category of relevant content, and with the plurality of enumerated video segments including a plurality of key frames occurring at time intervals within the enumerated video segments;

identifying a plurality of portions of enumerating text in the plurality of key frames by performing character recognition on the video images corresponding to the key frames so that the enumerating text, in the form of a series of numerals, is recovered as text from images that make up the enumerated video compilation;

storing the plurality of portions of enumerating text and an identification of respectively corresponding key frames where each portion of enumerating text is respectively located;

analyzing the recovered text making up the plurality of portions of enumerating text to identify time locations in the video compilation of a first occurrence of each portion of enumerating text;

providing location references in the enumerated video compilation that respectively link to the identified time locations; and navigating, with respect to time, through the plurality of enumerated video segments based, at least in part, on the location references.

2. The CIM as claimed in claim 1 further comprising:

providing a user interface where the location references are made available to a user as quick skip options.

3. The CIM as claimed in claim 1 further comprising:
analyzing a title or a description of the enumerated video compilation to obtain a search number value for the enumerated video compilation of the number of enumerated segments.

4. The CIM as claimed in claim 1 wherein identification of the plurality of portions of enumerating text includes performing an Optical Character Recognition (OCR) scan on each keyframe of the plurality of key frames to determine the series of numerals corresponding to the enumerating text.

5. The CIM as claimed in claim 1 wherein the storing of the identified plurality of portions of enumerating text includes storing, for each portion of the plurality of portions of enumerating text, a respective time, a respective text string, and respective location in the key frame.

6. The CIM as claimed in claim 1 wherein the analysis of the plurality of portions of enumerating text information to identify respectively corresponding time locations in the video compilation of a first occurrence of each enumerating value includes:
locating a maximum or minimum enumerating value and determining a frame location in a key frame; and
locating incrementing or decrementing enumerating values in corresponding frame locations in key frames.

7. The CIM as claimed in claim 6, wherein the analysis of the plurality of portions of enumerating text to identify respectively corresponding time locations in the video compilation of a first occurrence of each enumerating value includes:
identifying a missing enumerating value; and
searching a portion of the video compilation between neighboring found enumerating values at a higher frequency of key frames up to a defined limit.

8. The CIM as claimed in claim 1 wherein the provision of the location references in the enumerated video compilation includes providing a user interface control to move to the respective location references on demand.

9. The CIM as claimed in claim 1 wherein the provision of the location references in the enumerated video compilation includes marking the location references on a time bar of the enumerated video compilation.

10. A computer program product (CPP), in the form of a manufacture, for identifying segment starting locations in video compilations, the CPP comprising:
a set of storage device(s); and
computer code stored collectively in the set of storage device(s), with the computer code including data and instructions to cause a processor(s) set to perform at least the following operations:
receiving an enumerated video compilation, with the enumerated video compilation including a plurality of enumerated video segments within a category of relevant content, and with the plurality of enumerated video segments including a plurality of key frames occurring at time intervals within the enumerated video segments,
identifying a plurality of portions of enumerating text in the plurality of key frames by performing character recognition on the video images corresponding to the key frames so that the enumerating text, in the form of a series of numerals, is recovered as text from images that make up the enumerated video compilation,
storing the plurality of portions of enumerating text and an identification of respectively corresponding key frames where each portion of enumerating text is respectively located,
analyzing the recovered text making up the plurality of portions of enumerating text to identify time locations in the video compilation of a first occurrence of each portion of enumerating text,
providing location references in the enumerated video compilation that respectively link to the identified time locations, and
navigating, with respect to time, through the plurality of enumerated video segments based, at least in part, on the location references.

11. The CPP as claimed in claim 10 wherein the computer code further includes instructions for causing the processor(s) set to perform the following operation(s):
providing a user interface where the location references are made available to a user as quick skip options.

12. The CPP as claimed in claim 10 wherein the computer code further includes instructions for causing the processor(s) set to perform the following operation(s):
analyzing a title or a description of the enumerated video compilation to obtain a search number value for the enumerated video compilation of the number of enumerated segments.

13. The CPP as claimed in claim 10 wherein identification of the plurality of portions of enumerating text includes performing an Optical Character Recognition (OCR) scan on each keyframe of the plurality of key frames to determine the series of numerals corresponding to the enumerating text.

14. The CPP as claimed in claim 10 wherein the storing of the identified plurality of portions of enumerating text includes storing, for each portion of the plurality of portions of enumerating text, a respective time, a respective text string, and respective location in the key frame.

15. The CPP as claimed in claim 10 wherein the analysis of the plurality of portions of enumerating text information to identify respectively corresponding time locations in the video compilation of a first occurrence of each enumerating value includes:
locating a maximum or minimum enumerating value and determining a frame location in a key frame; and
locating incrementing or decrementing enumerating values in corresponding frame locations in key frames.

16. The CPP as claimed in claim 15, wherein the analysis of the plurality of portions of enumerating text to identify respectively corresponding time locations in the video compilation of a first occurrence of each enumerating value includes:
identifying a missing enumerating value; and
searching a portion of the video compilation between neighboring found enumerating values at a higher frequency of key frames up to a defined limit.

17. The CPP as claimed in claim 10 wherein the provision of the location references in the enumerated video compilation includes providing a user interface control to move to the respective location references on demand.

18. The CPP as claimed in claim 10 wherein the provision of the location references in the enumerated video compilation includes marking the location references on a time bar of the enumerated video compilation.

19. A computer system (CS) comprising:
a processor(s) set;
a set of storage device(s); and
computer code stored collectively in the set of storage device(s), with the computer code including data and instructions to cause the processor(s) set to perform at least the following operations:
receiving an enumerated video compilation, with the enumerated video compilation including a plurality of enumerated video segments within a category of relevant content, and with the plurality of enumerated video segments including a plurality of key frames occurring at time intervals within the enumerated video segments,
identifying a plurality of portions of enumerating text in the plurality of key frames by performing character recognition on the video images corresponding to the key frames so that the enumerating text, in the form of a series of numerals, is recovered as text from images that make up the enumerated video compilation,
storing the plurality of portions of enumerating text and an identification of respectively corresponding key frames where each portion of enumerating text is respectively located,
analyzing the recovered text making up the plurality of portions of enumerating text to identify time locations in the video compilation of a first occurrence of each portion of enumerating text,
providing location references in the enumerated video compilation that respectively link to the identified time locations, and
navigating, with respect to time, through the plurality of enumerated video segments based, at least in part, on the location reference.

20. The CS as claimed in claim 19 wherein the computer code further includes instructions for causing the processor(s) set to perform the following operation(s):
providing a user interface where the location references are made available to a user as quick skip options.

* * * * *